United States Patent

[11] 3,607,584

| [72] | Inventor | Cletus A. Becht |
| | | Akron, Ohio |
| [21] | Appl. No. | 710,300 |
| [22] | Filed | Mar. 4, 1968 |
| [45] | Patented | Sept. 21, 1971 |
| [73] | Assignee | Goodyear Aerospace Corporation |
| | | Akron, Ohio |

[54] LAMINATED LIGHTWEIGHT REFLECTOR STRUCTURES
3 Claims, 5 Drawing Figs.

[52] U.S. Cl. .................................................. 161/4,
161/161, 161/166, 161/213, 350/288, 350/293, 350/296
[51] Int. Cl. .................................................. G02b 5/08,
B32b 15/08, B29d 27/00
[50] Field of Search .......................................... 161/4,
159–161, 166, 184, 190, 214, 213; 117/35 V, 68, 107, 138.8 F; 350/288, 292–293, 296, 310; 52/309, 573

[56] References Cited
UNITED STATES PATENTS

| 3,502,532 | 3/1970 | Frielingsdorf | 161/159 X |
| 3,516,901 | 6/1970 | Fultz et al. | 161/166 X |
| 3,518,156 | 6/1970 | Windecker | 161/161 |
| 3,525,088 | 8/1970 | Thummel | 161/4 X |
| 3,528,877 | 9/1970 | Scharf | 161/214 X |
| 2,865,800 | 12/1958 | Stastny | 161/159 X |
| 3,082,510 | 3/1963 | Kelly et al. | 161/214 X |
| 3,184,210 | 5/1965 | Fassnacht et al. | 52/309 X |
| 3,202,998 | 8/1965 | Hoffman | 52/309 X |
| 3,383,152 | 5/1968 | Ward | 350/288 X |
| 3,422,495 | 1/1969 | Jones | 350/293 X |

Primary Examiner—Harold Ansher
Attorney—J. G. Pere

ABSTRACT: A method for forming a complex curved structure and the structure itself which is essentially directed towards making lightweight reflectors for use as mirrors or radar antennae. Essentially the process involves capturing a complex geometric shape with a thin layer of cured high density resin, depositing a lightweight resin foam on the back of the thin resin layer, and curing the foam to retain the desired geometric shape to the resin layer and provide an extremely lightweight structure. The foam can be in one or more laminated layers to give greater structural rigidity properties, or dent-resistance. A resin impregnated fiberglass material covers the back of the laminated structure to provide structural integrity. The composite product is up to 10 times lighter than similar metallic or glass structures, and has extremely good optical qualities when formed for mirror surfaces. A thin reflective metallic coating can be deposited after the entire laminate is formed, or it can be deposited onto a thin plastic sheet which in turn is laminated to the formed resin layer.

PATENTED SEP 21 1971 3,607,584
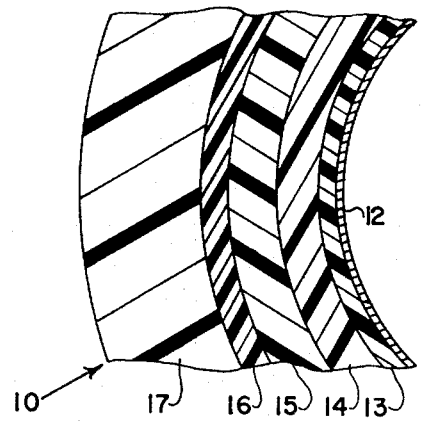
FIG.-1
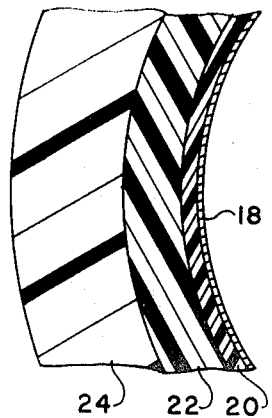
FIG.-2
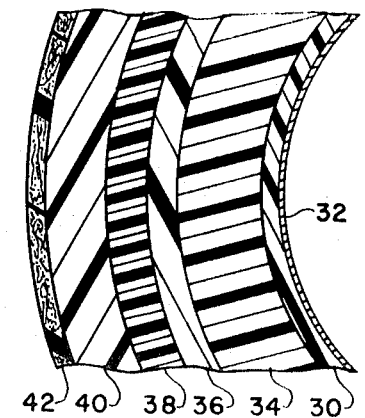
FIG.-3
FIG.-4
| 1 | POUR RESIN | |
| 2 | SUBJECT TO A VACUUM AND HEAT TO CURE AND REMOVE BUBBLES | |
| 3 | POUR HIGH DENSITY FOAM | |
| 4 | POUR RESIN | |
| 5 | REPEAT STEP 2 | |
| 6 | POUR LOW DENSITY FOAM | |
| 7 | ADD LAYERS OF RESIN IMPREGNATED FABRIC TO COVER ENTIRE LAMINATE | |
| 8 | REMOVE AND CUT TO SHAPE | |
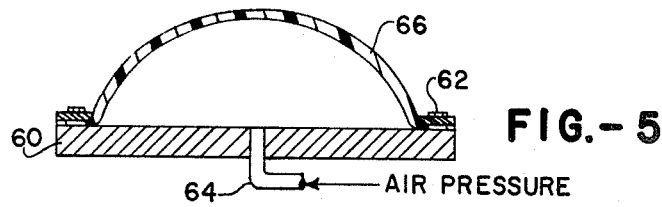
FIG.-5
INVENTOR
CLETUS A. BECHT
BY:
Oldham & Oldham
ATTORNEYS

LAMINATED LIGHTWEIGHT REFLECTOR STRUCTURES

The general object of the invention is to provide lightweight structures of complex curvatures, and teach the method for forming same, which structures have substantially the same properties as those heavier, more rigid, and more expensive prior art structures designed to accomplish the same objectives.

For better understanding of the invention, reference should be had to the accompanying drawings wherein:

FIG. 1 is an enlarged, cross-sectional illustration of a preferred embodiment of the structure of the invention showing the laminated relationship between the layers;

FIG. 2 is n enlarged, cross-sectional illustration of a modified form of the invention utilizing high density and low density foaming resins;

FIG. 3 is yet another enlarged, cross-sectional broken-away embodiment of the invention showing a multilayer laminated relationship;

FIG. 4 is a flow diagram illustrating the process of the invention to form the composite complex curvature structure of FIGS. 1–3, and FIG. 5 illustrates in schematic a structure which can be used to form a large inexpensive male mold surface.

With reference to the form of the invention illustrated in FIG. 1 of the drawings, the numeral 10 indicates generally a complex curved reflector which comprises in laminated relationship, a reflective layer 12, a plastic flexible base carrier 13, a thin resin reinforcing layer 14, a higher density foamed resin lightweight layer 15, a second thin resin layer 16, and a ticker lower density foamed outer layer 17. Essentially, the reflective layer 12 will conventionally be an aluminum layer vapor deposited onto the base carrier 13 by known techniques. The base carrier 13 may for example be a thin sheet of "Mylar," a product made by E.I. duPont de Nemours and Co. The foam layers 15 and 17 normally will have much greater thickness than the combined base carrier 13 and reflector layer 12 so as to provide the desired rigidity to the complex curvature desired. The resin layers 14 and 16 ensure a good bond of the layers adjacent thereto. Typical figures for the thickness of the layers would be for the reflective layer 12 to be between 0.001 to 0.003 inches, he base carrier 13 to be between 0.003 to 0.005 inches, the resin layers 14 and 16 to be between 0.005 to 0.015 inches, the foamed layer 15 to be between 0.050 to 0.250 inches and the layer 17 to be between 0.250 to 1.500 inches.

FIG. 2 represents a modified embodiment of the structure, which shows a laminate consisting of a reflector layer 18 laminated to an inner plastic flexible layer 20. The rigidization of this laminate is then accomplished by utilizing a high density plastic foam layer 22 backed directly by a low density plastic foam 24, with the high density foam giving the surface of reflector layer 18 great rigidity, and resistance to denting, etc., while the low density foam 24 provides further strength and rigidity to the total laminate combination, while giving lower weight to the overall combination.

An alternative reflective structure which has also proven to be extremely lightweight and highly effective is illustrated in FIG. 3. In this laminate, a reflective coating 32, is applied directly to a thin resin layer 30, this being achieved in the usual manner by vacuum deposition or the like, and backed and held in geometrically formed position by four alternating layers of epoxy and high density foam, these being indicated by numerals 34 through 40, respectively. It is interesting to note that the best thickness structure for layers 34–40 is for epoxy layer 34 to be about twice the thickness of epoxy layer 38, whereas foam layer 36 is only about one-half the thickness of foam layer 40. The entire laminate is then backed by a layer 42 of resin impregnated fiberglass. It has been found that using this laminate arrangement a large mirror of spherical section would weigh about 16 lbs. per cubic foot, which is about one-fifth to one-tenth the weight of a corresponding metal reflector or glass mirror.

The preferable method of the invention is clearly illustrated in FIG. 4 of the drawings which shows that the first step is to pour a thickened resin layer over a male mold with a complex surface to capture the surface of this mold in the resin layer. The actual pour techniques utilized are critical to obtaining a uniform thickness layer onto the surface of the mold without distortion. The mold surface is coated with some type of release layer prior to the resin pour. The mold surface is normally in a horizontal position as is indicated in the step 1 portion of the drawings, and the pour normally begins at the very top or apex of the complex curved form. The optimum pour technique is then to move the mold or the nozzle with respect to each other in a rather spiraling circular pattern as the resin flows down over the mold surface always keeping the pour within the resin that has been previously poured thereon, but eliminating the streams which would tend to form if the entire pour were made at the top or apex of he mold. This type of spiralling circular movement is continued until the entire surface of the mold has been evenly coated.

It has also been found that the rate of pour is critical to the consistency and uniformity of the layer. Specifically, the nozzle size and viscosity of the resin poured must be controlled to eliminate bubbles in the layer as it is poured, as the bubbles cause distortions in the resin layer which is attempting to capture the surface of the male mold.

Some technique must then be incorporated after the pour of the resin layer of step 1 to positively insure removal of all bubbles or air entrainment which has occurred during the pour, and which normally occurs during the pour regardless of excessive efforts to control nozzle size and resin viscosity and speed of pour in accordance with the procedures of step 1 set forth above. Hence, the invention has found the most suitable method to achieve this step in the process is to insert the mold and layer poured thereon to a vacuum to remove the bubbles. Hence, step 2 indicates the mold being inserted into a vacuum chamber with vacuum being drawn thereon with heat simultaneously applied wherein the heat cures the resin layer, and the vacuum forces all bubbles out of the layer so that a perfect layer is formed to capture the surface of the mold.

Once the mold surface has been captured with the resin layer, successive pours can be made to strengthen and retain the shape of the formed resin layer. Essentially, this involves first pouring a high density foam as indicated in step 3, which pour again is critical and similar to the procedure set forth in step 1 above. However, no vacuum technique or other means to remove bubbles is necessary with the high density foam pour since air entrainment necessarily is not an undesirable aspect of this layer. The invention contemplates that the high density foam will have very fine cell structure without great thickness.

The high density foam pour is followed by a second resin pour, indicated in step 4, which is exactly the same as the pour of step 1. Consequently, step 2 must be repeated to eliminate air entrainment in this resin pour. The purpose for the second resin layer is to ensure a positive bond between the high density foam and a low density foam pour indicated by step 6. Naturally, the low density foam pour is accomplished in the same manner as the subsequent pours, but will be thicker, but of less specific gravity and a larger cell structure than the high density foam. The density and thickness of the foam layers can be controlled by a particular catalyst added, but the pour of these layers is also critical to get the uniform distribution and thickness.

The process is completed by adding layers of resin impregnated fabric to cover the entire laminate outer surface to provide a composite structure. The composite laminated structure is the removed and cut to the desired shape as indicated by step 8 of the process.

After removal and cutting to shape, a reflective surface can be vapor deposited onto the form captured by the first resin layer. For extremely high precision surfaces, and large surfaces, it is best to deposit the reflective layer after the laminate composite has been formed as illustrated in FIG. 4 with steps 1–8. However, in certain circumstances, a Mylar film with the reflective layer already deposited thereon can be draped over the male form and stretched to the form shape before the first resin layer of step 1 of FIG. 4 is applied, with this resin layer being applied directly over the metallized Mylar film. As long as the film is not stretched too much in the forming process, the metallized layer will not be deformed or distorted, and this technique can be utilized. However, where extremely large reflective surfaces are desired, such as perhaps greater than 4 feet in diameter, it has been found that the Mylar films stretch enough to cause distortion to a metal layer preformed thereon, and hence metallizing after the total composite formation is preferable.

One other critical aspect in the process set forth with respect to FIG. 4 is to make sure that during the pouring and formation of the foam layers, which are exothermic reactions, and generate heat, the heat generated will not cause distortion to the surface captured by the resin layer, or Mylar film. To this end, the invention defines a maximum temperature on the mirror surface of 120° F. Any temperatures above this maximum, if for greater than 30 minutes, will cause distortion and damage to the surface of the resin layer. Of course the temperature at the reflective surface can be controlled by the thickness and density of the foam material, thereby controlling the total amount of heat given off in the exothermic reaction of the foaming itself.

In the situations where the cost of a large male mold would be prohibitive, the invention contemplates a process such as that shown in FIG. 5 wherein a large plastic sheet, again such as Mylar pointed out above, is positioned over a large flat plate 60 and clamped at the edges with a suitable clamping ring 62. Air pressure is then introduced through a hole 64 in the base of plate 60. This in effect forces the sheet 66 into a complex geometric shape, dependent upon the total air pressure applied. The invention contemplates that some suitable type of template can be utilized to measure the pressurized geometric shape of sheet 66 until it approaches or substantially coincides with the shape desired. At that point, the pressure causing the formation is released until a static equilibrium is determined because of the elastic memory of the sheet which just holds the sheet in the desired pressured configuration. The pours are then made on the sheet surface itself in exactly the same manner as set forth with respect to FIG. 4 above, and the sheet itself becomes a part of the laminate composite and the metallized coating can be deposited thereon, as selectively desired.

Thus it is seen that a lightweight, portable, yet highly effective reflective structure is provided, and the method for forming thereof, which represents distinct improvements over the existing art. However, it is to be understood that the invention is not limited thereto or thereby, but that the inventive scope is defined in the appended claims.

What is claimed is:

1. A lightweight reflector comprising:
   a first thin reinforcing layer consisting of a lightweight, high density foamed resin, one surface of the first layer formed to the desired geometric shape;
   a continuous, flexible plastic base laminated to the formed surface of the first reinforcing layer;
   a metallized reflective coating formed on the plastic base; and
   at least one additional reinforcing layer laminated to the first reinforcing layer, at least one of the additional layers being of greater thickness than the first reinforcing layer and consisting of a foamed resin of lower density than the foamed resin of the first layer.

2. The lightweight reflector according to claim 1 wherein at least one of the additional reinforcing layers comprises a resin impregnated fiberglass layer, at least two foamed resin layers being provided between the reflective coating and the fiberglass layer.

3. The lightweight reflector according to claim 1 wherein a thin resin layer is positioned between the high density foamed layer and the low density foamed layer to ensure complete bonding therebetween.